(12) United States Patent
Haussecker et al.

(10) Patent No.: US 7,992,465 B2
(45) Date of Patent: Aug. 9, 2011

(54) DRIVE UNIT FOR ACTUATORS IN A MOTOR VEHICLE

(75) Inventors: Walter Haussecker, Buehlertal (DE);
Stefan Freund, Gaggenau (DE);
Thomas Huck, Rheinmuenster (DE);
Markus Ochs, Baden-Baden-Steinbach (DE)

(73) Assignee: Robert Bosch GmbH, Stuttgart (DE)

( * ) Notice: Subject to any disclaimer, the term of this patent is extended or adjusted under 35 U.S.C. 154(b) by 1762 days.

(21) Appl. No.: 10/540,713

(22) PCT Filed: Jul. 15, 2003

(86) PCT No.: PCT/DE03/02371
§ 371 (c)(1),
(2), (4) Date: Jun. 14, 2005

(87) PCT Pub. No.: WO2004/057733
PCT Pub. Date: Jul. 8, 2004

(65) Prior Publication Data
US 2006/0083583 A1    Apr. 20, 2006

(30) Foreign Application Priority Data
Dec. 19, 2002   (DE) .................. 102 60 104

(51) Int. Cl.
*F16H 57/02*  (2006.01)
*F16H 57/04*  (2006.01)
*F16H 61/00*  (2006.01)
*H02K 5/00*   (2006.01)
*F16B 37/04*  (2006.01)

(52) U.S. Cl. .............. 74/606 R; 310/89; 310/91; 403/21

(58) Field of Classification Search ............... 74/606 R, 74/89.14, 425; 24/31 B; 403/24, 282, 21; 411/303; 55/378; 384/433; 219/757; 310/89, 310/91, 51, 208
See application file for complete search history.

(56) References Cited

U.S. PATENT DOCUMENTS

| | | | | |
|---|---|---|---|---|
| 3,463,951 A | * | 8/1969 | Bauerle et al. | 310/51 |
| 4,156,821 A | | 5/1979 | Kurome et al. | |
| 4,600,343 A | * | 7/1986 | Frerejacques | 411/303 |
| 4,836,705 A | * | 6/1989 | La Barge et al. | 403/282 |
| 4,938,086 A | * | 7/1990 | Nolte et al. | 74/89.14 |
| 4,942,323 A | * | 7/1990 | DeCesare | 310/208 |
| 4,987,791 A | * | 1/1991 | Nakahashi et al. | 74/425 |

(Continued)

FOREIGN PATENT DOCUMENTS

| | | |
|---|---|---|
| DE | 197 10 557 | 4/1998 |
| EP | 1 101 968 | 5/2001 |
| EP | 1 176 698 | 1/2002 |
| FR | 2769427 | 4/1999 |
| JP | 60167643 | 8/1985 |
| WO | WO 01/61133 | 8/2001 |

OTHER PUBLICATIONS

STIC, Machine Translation of WO 01/61133, Hager et al.*

*Primary Examiner* — Vinh T. Luong
(74) *Attorney, Agent, or Firm* — Michael Best & Friedrich LLP

(57) ABSTRACT

A drive unit (10) actuates drives in a motor vehicle with a first housing part (12), in particular a pole pot (12), and a second housing part (14), in particular a gear housing or electronic housing (14, 15), which can be connected with connecting elements (40), wherein the first housing part (12) features receptacles (38) for the connecting elements (40), wherein the receptacles (38) are embodied as centering holes (36) for corresponding centering pins (48), which are arranged on the second housing part (14).

12 Claims, 4 Drawing Sheets

U.S. PATENT DOCUMENTS

| | | | |
|---|---|---|---|
| 5,216,929 A * | 6/1993 | Ochiai et al. | 74/425 |
| 5,836,219 A | 11/1998 | Klingler et al. | |
| 5,928,395 A * | 7/1999 | Glen et al. | 55/378 |
| 6,278,209 B1 * | 8/2001 | Rupp et al. | 310/91 |
| 6,345,925 B1 * | 2/2002 | Coleman | 403/24 |
| 6,422,755 B1 * | 7/2002 | Cadle et al. | 384/433 |
| 6,486,577 B1 * | 11/2002 | Ursel et al. | 310/51 |
| 6,713,913 B1 * | 3/2004 | Hager et al. | 310/89 |
| 6,820,309 B1 * | 11/2004 | Gersbach | 24/31 B |
| 6,881,938 B2 * | 4/2005 | Kim | 219/757 |
| 2008/0054744 A1 * | 3/2008 | Fornoff et al. | 310/89 |

* cited by examiner

DRIVE UNIT FOR ACTUATORS IN A MOTOR VEHICLE

BACKGROUND OF THE INVENTION

The invention concerns a drive unit, in particular for actuating drives in a motor vehicle.

A window lifter drive became known from WO 01/61133 whose housing includes a pole pot and a housing terminating the pole pot. In this case, the housing terminating the pole pot is a gear housing with an integrated electronic housing, wherein a separate component is arranged between the two parts of the housing as a brush holder that simultaneously serves as seal between the parts of the housing. The pole pot is composed of a deep-drawn, smoothed-down, cylindrical tube on whose open end a flange is formed in which holes to accommodate screws are left open. Formed in the flange of the gear housing are pocket threads into which the screws are screwed thereby solidly connecting the two parts of the housing with one another.

In the case of such types of housings, centering bore holes are normally also attached on a flange for the purpose of centering the two parts of the housing and centering pins, which are formed on the second flange, engage in the centering bore holes. In doing so, the centering bore holes and the corresponding centering pins are arranged completely independently of the receptacles and the counter receptacles of the connecting elements. Forming the centering pins and the centering bore hole is associated with an additional processing step, which is quite expensive especially if the pole pot is made of metal. In addition, the centering pins in this case have such a small diameter that they can be damaged easily thereby impairing the precise centering of the two parts of the housing.

SUMMARY OF THE INVENTION

The device in accordance with the invention has the advantage that holes formed on the first part of the housing can simultaneously be used to accommodate the connecting elements and to accommodate the centering pins of the second housing part. As a result, an additional procedural step to attach the centering bore holes is eliminated. In addition, with this arrangement the diameter of the centering pins is greater than that of the connecting elements, thereby creating a strong pole housing centering, which can accommodate high forces acting primarily radially on the drive unit over the entire range of temperature and service life. This guarantees a precise bearing of the motor components, which increases the service life of the drive and suppresses the development of noise.

Advantageous further developments of the device are possible. If the centering pins of the second part of the housing are embodied as connecting elements for example, additional separate components can potentially be dispensed with. In this connection, the centering pins can be embodied as rivets, for example, which are deformed plastically in the head area after insertion into the centering holes of the first part of the housing.

Another possibility consists of forming counter receptacles such as holes on the second housing part, on which a circumferential centering pin is formed radially.

If this centering pin is sleeve-like, it can accommodate a connecting element in the interior and is therefore extremely capable of bearing radial shearing forces.

It is beneficial if the centering pin is beveled at least on the external cylinder wall in order to facilitate insertion into the corresponding centering holes of the first housing part.

Since the centering holes accommodate the connecting elements together with the centering pins, it is necessary that the head of the connecting elements be selected to be large enough so that it has an adequate bearing surface on the first housing part.

If the centering holes in the flange of the first housing part are embodied as through openings, it is advantageous if the height of the centering pin is less than the thickness of the first housing part flange in order to guarantee an adequate pressure force of the head of the connecting element on the first housing flange.

The tolerances of the centering holes and the centering pins are advantageously selected in such a way that together they form a clearance fit. In this connection, the play of the clearance fit can be adapted to the bearing requirements of the housing of the drive unit.

If, for example, a continuous armature shaft is positioned in both housing parts, such a centering device in accordance with the invention thereby prevents shearing or lateral forces from acting on the shaft.

When using plastic housings, it is particularly beneficial to form counter receptacles as holes in the second housing flange. If screws, for example, are used as connecting elements, they can cut a thread in the wall of the counter receptacle when they are being installed.

BRIEF DESCRIPTION OF THE DRAWINGS

Exemplary embodiments of a device in accordance with the invention are depicted in the drawings and explained in greater detail in the description below.

The drawings show.

DETAILED DESCRIPTION

Figure 1:
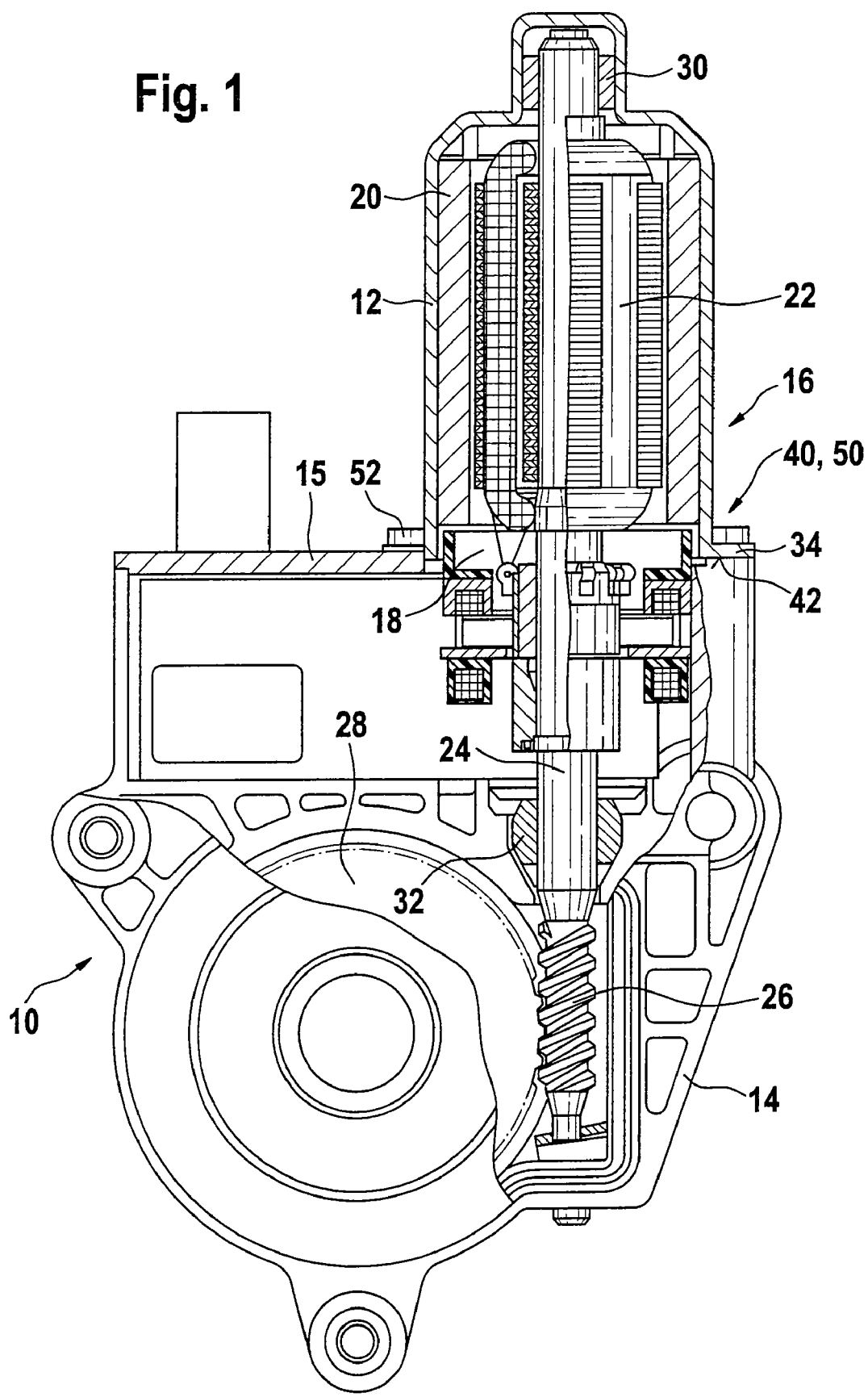
FIG. 1 A section of an exemplary embodiment of a drive unit.

The exemplary embodiment depicted in FIG. 1 shows a drive unit 10 in accordance with the invention, wherein a first housing part 12 is embodied as a pole pot of an electric motor 16 and a second housing part 14 is embodied as a gear housing. Arranged between the first and second housing part 12, 14 is a brush holder 18, which, in an alternative execution, can also be embodied as another housing part 14. Permanent magnets 20 are arranged in the first housing part 12, which cooperate with an armature 22 of the electric motor 16. The electric motor 16 features an armature shaft 24 that extends through the brush holder 18 into the gear housing 14. A worm 26 that engages in a worm wheel 28 is arranged on the armature shaft 24. The armature shaft 24 is positioned, on the one hand, in the first housing part 12 by means of a cylinder bearing 30, for example, and in the second housing part 14 by means of a spherical cap bearing 32, for example. An electronic housing 15 is integrated into the second housing part 14 in the exemplary embodiment.

Figure 2:
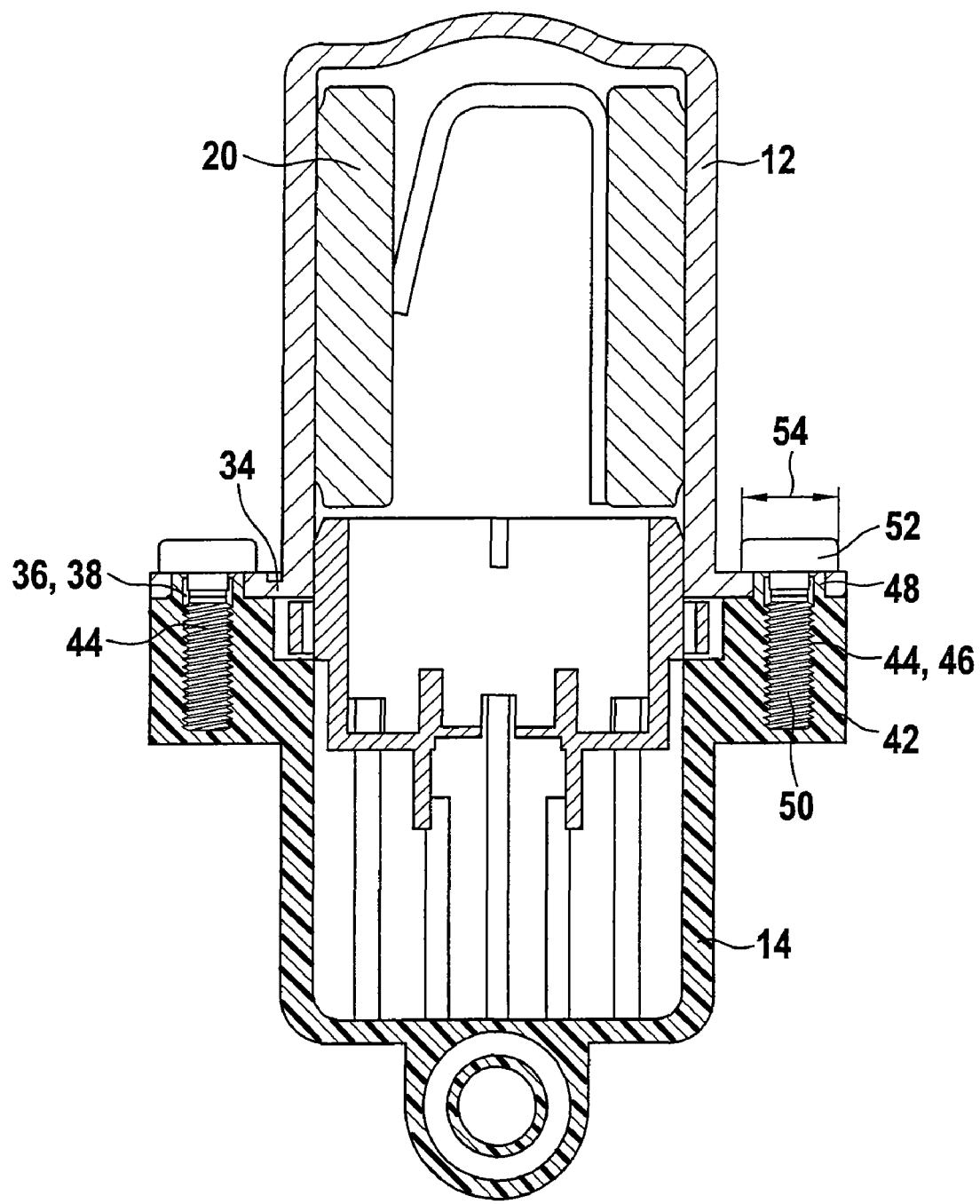
FIG. 2 A section of another drive unit.

FIG. 2 depicts a section through a housing 12, 14 of another drive unit 10 with a first housing part 12 and a second housing part 14. The first housing part 12 features a flange 34 in which the centering holes 36 are arranged, which simultaneously serve as receptacles 38 for connecting elements 40 between the two housing parts 12, 14. The second housing part 14 also features a flange 42 in which holes 46 are formed as counter receptacles 44. Formed around the counter receptacles 44 are sleeve-like centering pins 48, which engage in the centering holes 36 of the first housing part 12. The centering pins 48 together with the centering holes 36 form a clearance fit so that both housing parts 12 and 14 are centered vis-á-vis one another in such a way that a flawless bearing of the armature shaft 24 is achieved. After the two housing parts 12 and 14 are centered vis-á-vis one another, connecting elements 40 are inserted into the receptacles 38 and fastened in the counter receptacles 44. Screws 50 are used as connecting elements 40 in the exemplary embodiment and their heads 52 press the first flange 34 against the second flange 42. The head diameter 44 of the connecting element 40 is therefore greater than the diameter 56 of the centering holes 36. The second housing part 14 in this case is manufactured of plastic so that the screw 50 cuts a thread 58 in the wall of the hole 46 when it is screwed into the hole 46.

FIG. 3 again depicts the centering pin 48 according to FIG. 2, but in an enlarged version. The centering pin 48 in this case completely surrounds the counter receptacle 44 that is embodied as a hole 46. A bevel 60 is formed on an exterior wall 62 on the upper end of the cylinder pin 48 in order to facilitate insertion into the centering hole 36. A bevel 66 is also formed with an interior wall 64 of the centering pin 48 in order to facilitate insertion of the connecting means 40 in the centering pin 48 and the counter receptacle 44. The centering pin 48 in this case is manufactured as a single piece with the second housing part 14 using an injection molding process.

Figure 3:
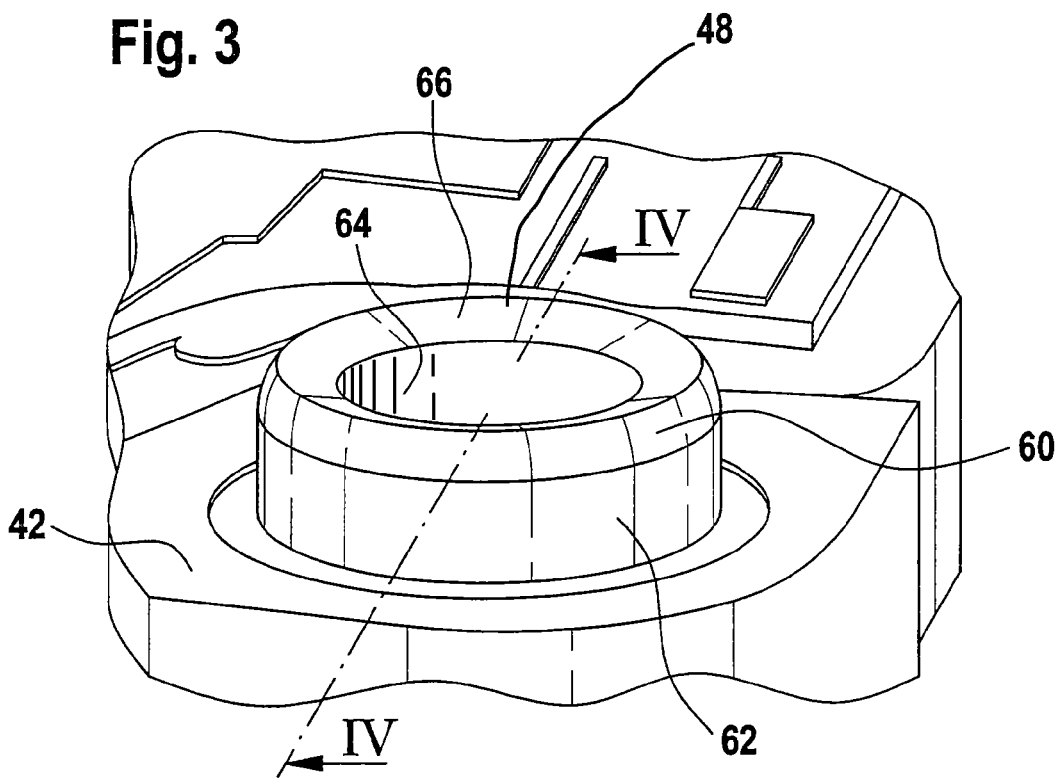
FIG. 3 An enlarged centering pin.
Figure 4:
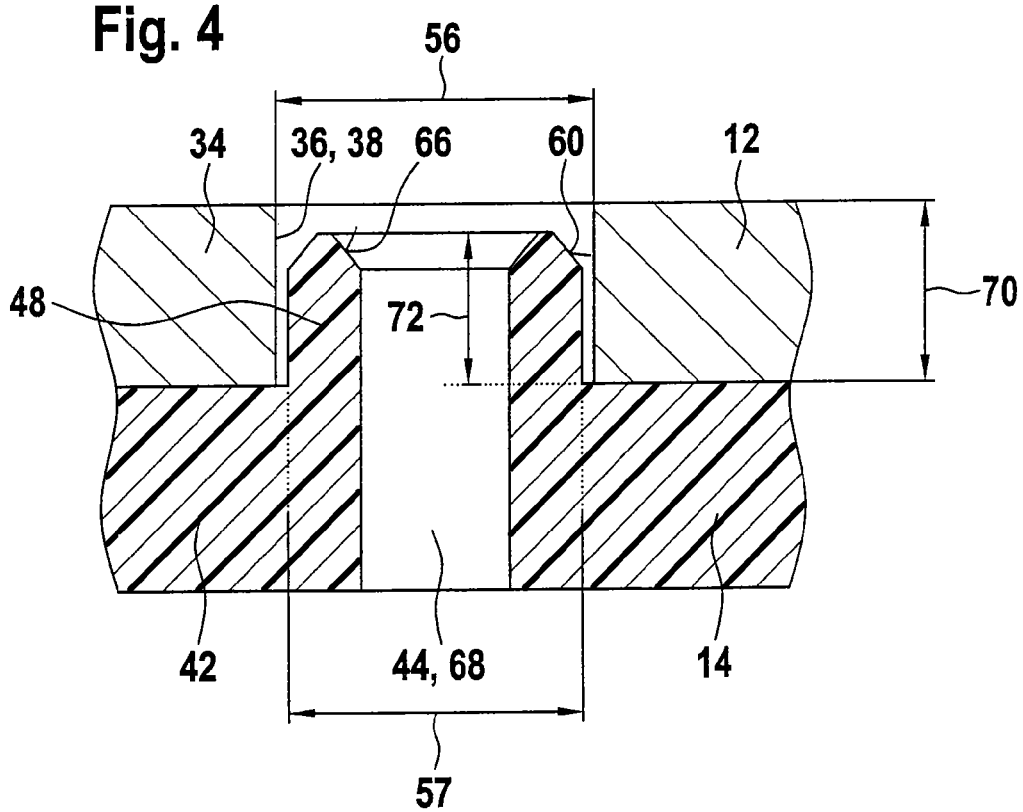
FIG. 4 A section through the centering pin according to FIG. 3.

FIG. 4 shows a section through the centering pin 48 according to IV-IV in FIG. 3, wherein the counter receptacle 44 is embodied as a through hole 68. The centering pin 48 in this case is inserted into the centering hole 36 of the flange 34, which features a thickness 70 that is greater than the height 72 of the centering pin 48. As a result, after a connecting element 40 is inserted, its head 52 can directly abut the flange 34. A screw 50 with a nut 52 or a rivet 80 can also be used as a connecting element 40, for example, which is deformed on both ends until it abuts with positive engagement on the flanges 34 and 42. Alternatively, a screw 50 in accordance with FIG. 2 can also be used, which cuts a thread in the counter receptacle 44.

Figure 5:
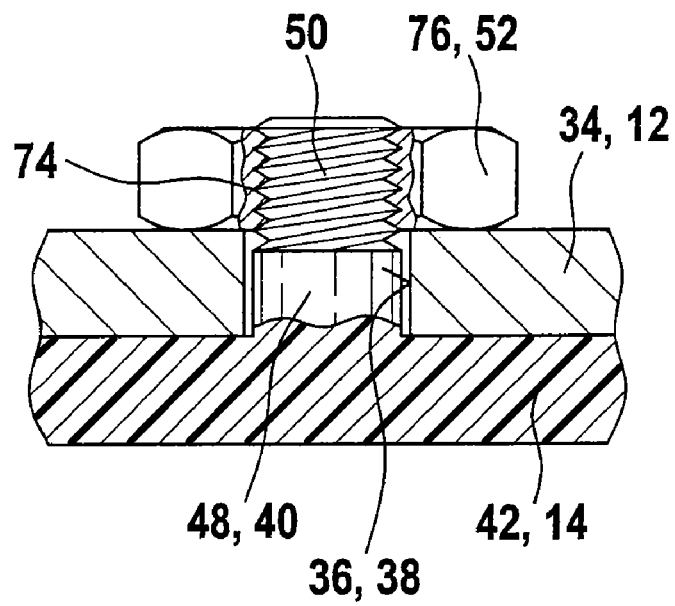
FIG. 5 A section of another exemplary embodiment of the centering device.

FIG. 5 depicts a section of another exemplary embodiment in which the centering pin 48 is simultaneously embodied as the connecting element 40. In this case, the centering pin 48 features a diameter 57 in the area of the centering hole 36 that forms a clearance fit together the diameter 56 of the centering hole 36. In the axial extension, the centering pin 48 features a thread 74, for example, on which a threaded nut 76 is fastened as a second part of the connecting element 40.

Figure 6:
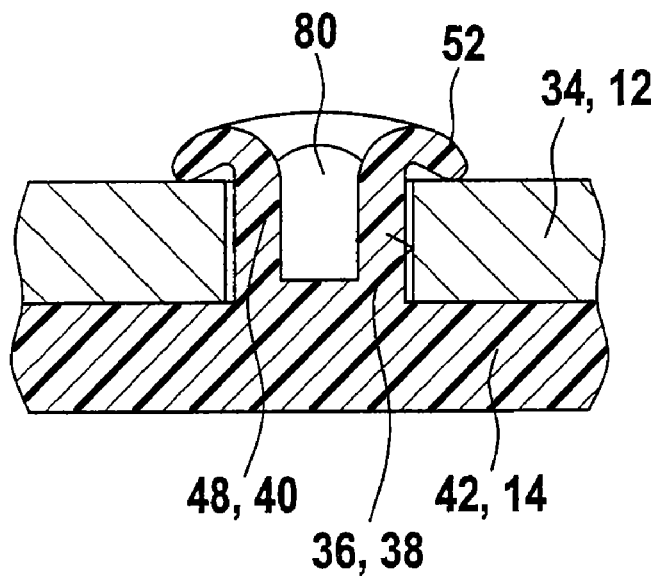
FIG. 6 Another variation of the centering device according to FIG. 5.

The centering pin 48 also simultaneously assumes the function of a connecting element 40 in the exemplary embodiment according to FIG. 6. Before insertion into the flange 34, the centering pin 48 has a sleeve shape, as depicted in FIG. 4 for example, however, the height 72 is clearly greater than the thickness 70 of the flange 34. As a result, the centering pin 48 can serve as a rivet 80, whose free end is deformed plastically over the flange 34, and as a head 52 of the connecting element 40, which presses both flanges 34 and 42 against one another. In this connection, the rivet 80 can be processed both in a cold forming process, for example in the case of a material made of metal, or in a heat forming method, for example when using plastic. Also in this embodiment, the outside diameter 57 of the centering pin 48 forms a clearance fit with the inside diameter 56 of the centering hole 36 in order to center both housing parts 12 and 14 vis-á-vis one another before the rivet 80 is deformed.

The invention is used preferably for adjusting movable parts in a motor vehicle such as window lifters, sunroofs, windshield wipers or seat adjusters, for example. The invention is not limited to specific gear designs such as the worm gear, but relates to any given embodiment of a gear. In a preferred embodiment, the first housing part is manufactured of metal and the second housing part 14 is manufactured of plastic, whereby the materials used do not limit the invention. In addition, the invention also includes individual features of the exemplary embodiments or any combination of the features of different exemplary embodiments.

The invention claimed is:

1. A drive unit (10) for actuating drives in a motor vehicle with a first housing part (12), and a second housing part (14), which is connected to the first housing part (12) by means of connecting elements (40), wherein the first housing part (12) features receptacles (38) for the connecting elements (40), characterized in that the receptacles (38) are embodied as centering holes (36) for corresponding centering pins (48), which are arranged on the second housing part (14), characterized in that the second housing part (14) features counter receptacles (44, 46) for the connecting elements (40), which are surrounded at least partially by the centering pins (48), characterized in that the first and second housing parts (12, 14) are assigned bearing functions for an armature shaft (24), characterized in that the centering pins (48) form a clearance fit together with the centering holes (36), wherein the first housing part (12) is a pole pot of an electric motor (16) and the second housing part (14) is a gear housing, and wherein a brush holder is arranged between the first housing part (12) and the second housing part (14).

2. Drive unit (10) according to claim 1, characterized in that the centering pins (48) are embodied as connecting elements (40).

3. Drive unit (10) according to claim 2, characterized in that the centering pins (48) are embodied to be sleeve.

4. Drive unit (10) according to claim 2, characterized in that the connecting elements (40) feature a head (52), whose diameter (54) is greater than the diameter (56) of the centering holes (36).

5. Drive unit (10) according to claim 2, characterized in that the centering holes (36) are arranged as through bore holes (36) in a flange (34) whose thickness (70) is greater than the height (72) of the centering pin (48).

6. Drive unit (10) according to claim 1, characterized in that the centering pins (48) are embodied to be sleeves.

7. Drive unit (10) according to claim 1, characterized in that lead-in bevels (60, 66) are formed on the centering pins (48).

8. Drive unit (10) according to claim 1, characterized in that the connecting elements (40) feature a head (52), whose diameter (54) is greater than the diameter (56) of the centering holes (36).

9. Drive unit (10) according to claim 1, characterized in that the centering holes (36) are arranged as through bore holes (36) in a flange (34) whose thickness (70) is greater than the height (72) of the centering pin (48).

10. Drive unit (10) according to claim 1, characterized in that the counter receptacles (44) are embodied as pocket holes or through holes (46).

11. Drive unit (10) according to claim 1, characterized in that lead-in bevels (60, 66) are formed on an inner and an outer perimeter of the centering pins (48).

12. A drive unit (10) for actuating drives in a motor vehicle with a first housing part (12), and a second housing part (14), which is connected to the first housing part (12) by means of connecting elements (40), wherein the first housing part (12) features receptacles (38) for the connecting elements (40), characterized in that the receptacles (38) are embodied as centering holes (36) for corresponding centering pins (48), which are arranged on the second housing part (14), characterized in that centering pins (48) and the second housing part (14) are formed as one unitary piece by injection molding, characterized in that the centering pins (48) form a clearance fit together with the centering holes (36), wherein the first housing part (12) is a pole pot of an electric motor (16) and the second housing part (14) is a gear housing, and wherein a brush holder is arranged between the first housing part (12) and the second housing part (14).

* * * * *